United States Patent
Ricketts

(10) Patent No.: US 7,656,802 B2
(45) Date of Patent: Feb. 2, 2010

(54) SIMULATING SERVICES ON DEMAND

(75) Inventor: John A. Ricketts, Clarendon Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 11/559,552

(22) Filed: Nov. 14, 2006

(65) Prior Publication Data

US 2008/0112321 A1    May 15, 2008

(51) Int. Cl.
  *G06F 11/00* (2006.01)
  *H04B 1/66* (2006.01)
(52) U.S. Cl. ............ 370/235; 370/230.1; 398/192; 375/240.01
(58) Field of Classification Search ......... 370/230–235, 370/236–236.1, 241.1; 715/234, 765; 707/103 R, 707/104.1, 205, 513, E17.009
See application file for complete search history.

(56) References Cited

U.S. PATENT DOCUMENTS

2002/0147745 A1 * 10/2002 Houben et al. .......... 707/513
2005/0010598 A1 *  1/2005 Shankar ............... 707/104.1

\* cited by examiner

*Primary Examiner*—Afsar M. Qureshi
(74) *Attorney, Agent, or Firm*—Dillon & Yudell LLP

(57) ABSTRACT

In order to apply and incorporate Drum-Buffer-Rope (DBR) concepts into a service enterprise environment, the present invention provides a method, system and computer-readable medium that expands DBR through the use of simulation of service activities. In a preferred embodiment, the inventive method includes the steps of: creating a DBR for Services ($DBR_S$) model of a service process; simulating the service process by populating the $DBR_S$ model with user-selected values for a constraint drum, a pre-constraint buffer, a service level rope, and a constraint rope, and determining if the service process will be in compliance with a Service Level Agreement (SLA) based on a $DBR_S$ simulation of the service process.

20 Claims, 13 Drawing Sheets

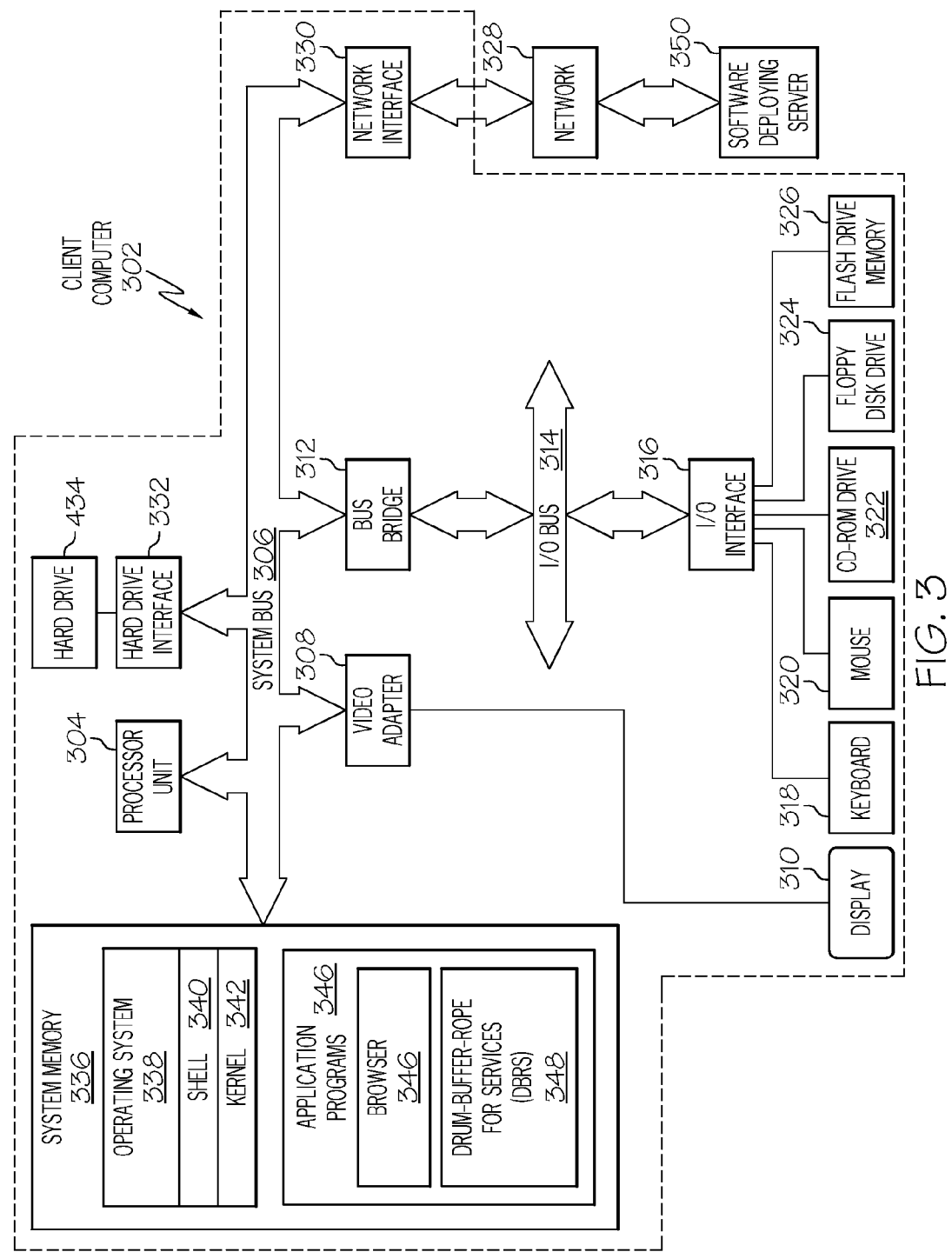

SIMULATING SERVICES ON DEMAND

CROSS REFERENCE TO RELATED APPLICATIONS

The present application is related to the following co-pending U.S. patent application: U.S. patent application Ser. No. 11/055,403 filed on Feb. 10, 2005. The above-mentioned patent application is assigned to the assignee of the present invention and is herein incorporated by reference in its entirety.

BACKGROUND OF THE INVENTION

1. Technical Field

The present invention relates in general to the field of computers, and more particularly to the use of computers to manage service processes. Still more particularly, the present invention relates to service simulations that incorporate the use of a Drum-Buffer-Rope (DBR) feedback mechanism.

2. Description of the Related Art

As manufacturers attempt to optimize their operational efficiency, many evaluate their manufacturing process by using a Drum-Buffer-Rope (DBR) feedback mechanism. DBR is a component of the Theory of Constraints (TOC), which was created by Eliyahu M. Goldratt. A key feature of DBR is to identify a constraint (i.e., equipment whose operation causes a bottleneck in the manufacturing process). The constraint operates at a specified rate ("Drum"). DBR is used to ensure that the constraint always has adequate material ("Buffer") on which to work. The Buffer is kept properly filled through the use of management feedbacks known as "Ropes."

For example, assume that a grinder is the constraint whose operating rate ("Drum") sets the pace at which an entire assembly line operates. All work that is performed before the grinding operation is considered to be the "Buffer," and includes raw materials in the warehouse, products that have been pre-processed (e.g., punched, shaped, rolled, etc.), as required, before being sent to the grinder. To ensure that the steps taken before the grinding operation are adequate to keep the grinder supplied with pre-processed material, an information system ("Rope"), which may be computer based, controls such "pre-grinder" operations.

While DBR works well in a manufacturing environment, utilizing DBR concepts in a service enterprise environment have previously been utilized in a limited fashion. Specifically, DBR concepts applied to services have been limited to environments in which service capacity is assumed to be fixed. What has not been accomplished in the prior art is the utilization of DBR concepts in which capacity is elastic, and then managing demands on the service resources based on such elastic capacity.

SUMMARY OF THE INVENTION

In order to apply and incorporate DBR concepts into a service enterprise environment that has elastic capacity, the present invention provides a method, system and computer-readable medium that expand DBR through the use of simulation of service activities. In a preferred embodiment, the inventive method includes the steps of: creating a Drum-Buffer-Rope for Services (DBR$_S$) model of a service process; simulating the service process by populating the DBR$_S$ model with user-selected values for a constraint drum, a pre-constraint buffer, a service level rope, and a constraint rope, and determining if the service process will be in compliance with a Service Level Agreement (SLA) based on a DBR$_S$ simulation of the service process.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 illustrates an exemplary client and server computer in which the present invention may be utilized;

DETAILED DESCRIPTION OF THE PREFERRED EMBODIMENT

Figure 1A:
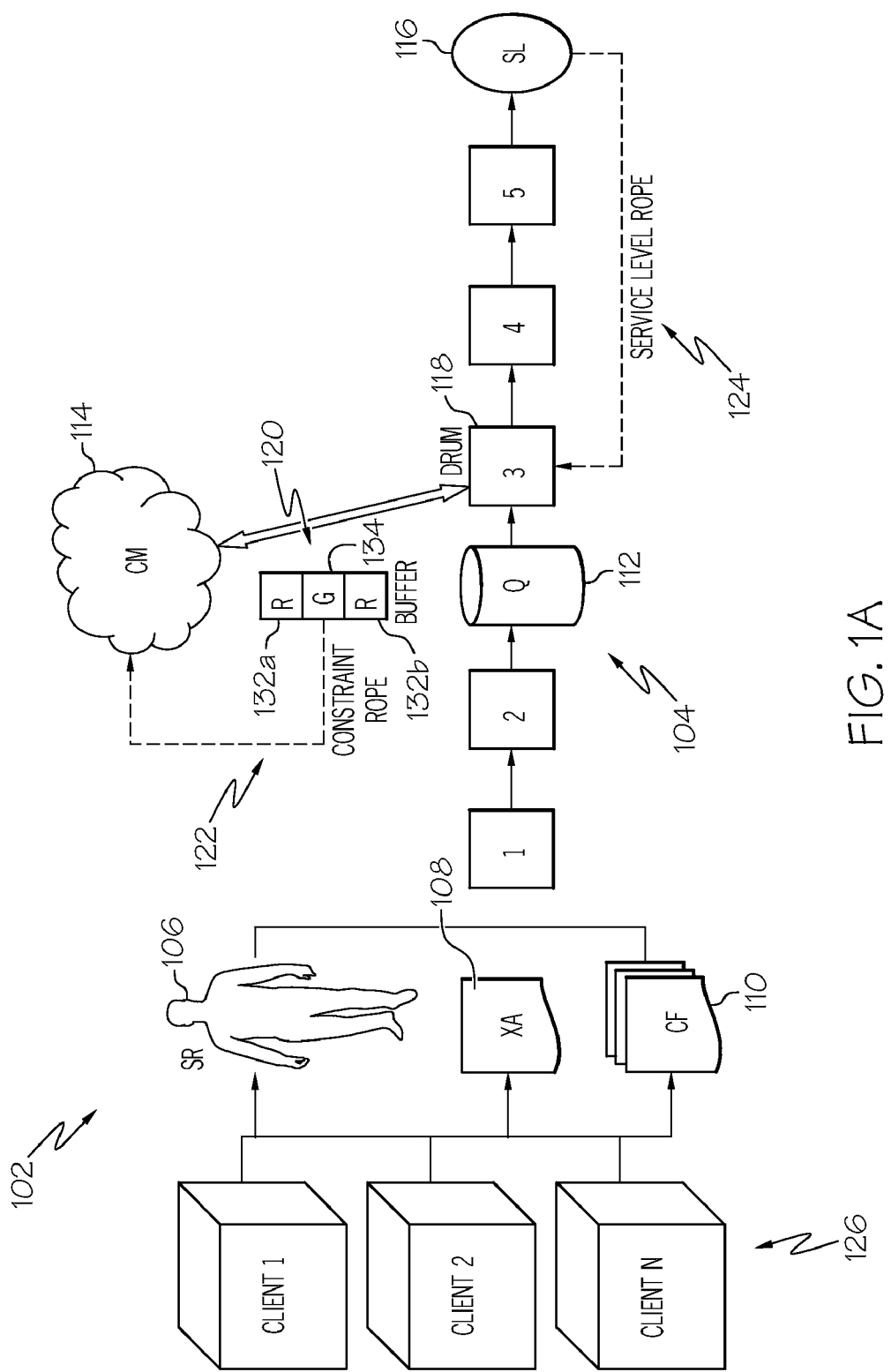
FIG. 1A depicts a Drum-Buffer-Rope model of a service process (DBR$_S$)

The present invention describes a method and system for simulating services, which are performed on demand, through the use of a Drum-Buffer-Rope for Services (DBR$_S$). DBR$_S$ is related to a method known as Drum-Buffer-Rope for Business Processes (DBR$_{BP}$), for which a patent was previously applied for in "Method and System for Managing a Business Process" (U.S. patent application Ser. No. 11/055,403). That application contrasts DBR$_{BP}$ with an older method invented for manufacturing, Drum-Buffer-Rope for Manufacturing (DBR$_M$).

DBR$_S$ and DBR$_{BP}$ are similar, yet distinct, because business processes and services can overlap. That is, some business processes can be delivered as services, but not all business processes are amenable to delivery as services, and not all services are business processes. For example, payroll is a business process that can often be delivered as a service. On the other hand, budgeting and planning is a business process that is seldom if ever delivered as a service because it requires confidential information, insider knowledge, and strategic decision-making. Finally, grounds-keeping, cafeterias, and limousines are services that are not business processes when they are not integral to the goods or services produced by the client enterprise.

The present invention extends $DBR_{BP}$ to apply to services; hence the alternate designation, $DBR_S$. The extension covers instances where a service provider performs business processes for multiple clients, which is notable for altering the demand pattern in ways that create leverage (high value at low cost). The present invention also simulates $DBR_S$ for purposes of research, education, and decision-support.

Projects Versus Processes

Services can be delivered in two ways: a project or a process.

A project is a set of finite-duration tasks that must be performed in a specified sequence to produce a desired result within a prescribed time and budget, such as performing a management consulting engagement, implementing a software product, or conducting a scientific study. In other words, a project is a non-iterative definite set of tasks that last for a finite duration.

A process, on the other hand, is a set of tasks performed continuously or on a frequently recurring schedule with no final completion date, such as operating a data center or call center, providing software maintenance or technical support, and processing payroll or tax returns. In other words, a process is an ongoing procedure, having no fixed duration period, which is highly iterative.

In a preferred embodiment, $DBR_S$ is utilized with processes.

Services as Available Versus Services on Demand

When a service provider's capacity limits the kind, amount, and timing of its services, it is delivering services as available. Though content, quantity, and due-dates may sometimes be negotiable, when the service provider is running at capacity, clients and service recipients must often accept the provider's availability, find another service provider, or do without the service. Under services as available, the consequences to the service provider of missing commitments are often minor and short-lived. Those consequences are often informal, and may result in less repeat business or smaller orders; but they rarely endanger the enterprise because they come at a time when the provider already has all the demand it can handle and clients may have few attractive alternatives.

When a service provider has sufficient capacity to deliver according to the client's or recipients' needs, it is delivering services on demand. Content, quantity, and due-dates are less often limited by service provider availability, even when the provider is busy, because it strives to accommodate each request, even if that means adjusting capacity. Under services on demand, the consequences to the provider of missing commitments are often major and long-lived. Those consequences may be formalized in a service level agreement (SLA) between the provider and client which rewards superior performance and penalizes inferior performance. An SLA may be formal or implicit. For example, a formal SLA between a restaurant and a patron may be that a meal will cost $10.00. An implicit SLA between the restaurant and the patron may be that the meal will be hot, tasty, and served with 20 minutes.

Inelastic Versus Elastic Services Capacity

Forces pushing clients and providers from services as available to services on demand include laws, regulations, contracts, and competition. For instance, tax laws and regulatory filings include due-dates that must either be met or formally extended. Likewise, supplier contracts and competitive offerings can be time-sensitive to the point that even small delays can have ripple effects that hurt earnings and depress share prices.

One way for a provider to deliver services on demand is to establish enough spare capacity to handle peak demand without creating unacceptable delays. This assumes, however, that peak demand is predictable and some amount of delay is tolerable. In a growing number of services, both the magnitude and timing of peak demand can be unpredictable. Furthermore, engineering a service to have inelastic capacity sufficient to meet peak demand can be prohibitively expensive.

A variation on the inelastic capacity approach is to engineer a service to have sufficient capacity only for "normal" demand fluctuations, but not peak demand. This reduces the expense, but it also means that the service is provided on demand only up to a point, and then it is service as available.

An alternate way to deliver services on demand is to create elastic capacity which expands and shrinks as needed. Elastic capacity can create flexibility at manageable cost if the adjustments are well-engineered. And if the adjustments can be made rapidly enough, even unpredictable changes in demand can be accommodated. Thus, not only are the consequences of inaccurate forecasts mitigated, the time and effort required to produce such forecasts are also reduced.

Balanced Versus Unbalanced Services Capacity

Service providers often-times strive to balance the capacity of every resource and activity comprising a service because that ensures every element attains high utilization. The underlying assumption is that if every element is balanced (optimized such that every resource and activity operates at the same pace), those local optimizations add up to global optimization of the enterprise. However, this assumption is questionable because keeping resources busy does not necessarily create value for the client or service recipients.

Even in an enterprise with balanced capacity, there is a constraint that limits what a service can produce. Otherwise, enterprises could grow as large and as fast as they want, which is obviously not the case. With balanced capacity, the constraint often floats among resources and activities as work flows through the process, but this does not alter the fact that one resource/activity at a time generally constrains the entire service. Moreover, when capacity is balanced, each change in overall capacity requires adjustments everywhere, which makes capacity management difficult.

Alternatively, when an enterprise has unbalanced capacity, every resource/activity has spare capacity except the constraint. That spare capacity is used by non-constraints to keep up with or catch up with the constraint when necessary. Thus, the constraint is much less likely to float, and a change in overall capacity may not affect any elements other than the constraint itself, which makes capacity management far simpler. Even if a change in overall capacity affects more than just the constraint, it's most likely to affect just capacity constrained resources (CCRs), which are the subset of resources with the least spare capacity.

Although it often seems counter-intuitive, an enterprise with unbalanced capacity can produce more products/services than one with balanced capacity. This result has been demonstrated for many years in manufacturing: Balanced capacity occasionally causes the constraint to become idle, and productive time lost on the constraint is time lost by the entire manufacturing process.

Drum-Buffer-Rope for Services

With reference now to the figures, and in particular to FIG. 1A, a Drum-Buffer-Rope for Services ($DBR_S$ 102) is illustrated. Through the use of $DBR_S$ 102 and available simulations, as described in detail below, services can be delivered on demand by unbalancing capacity and increasing the elasticity of a service stream 104. $DBR_S$ 102 is essentially a feedback mechanism that manages capacity in response to changes in demand as well as service level requirements. When capacity is unbalanced and elastic, queue times are shorter, and so is overall cycle time because it is then comprised mainly of service time.

Within FIG. 1A, dashed lines represent information flows, and solid lines represent service flows, which are often comprised of paper or digital records rather than physical inventory. Activities are numbered 1 through 5. Other symbols are as follows.

Service requests (SR 106) include, but are not limited to, contacts in person, as well as phone calls, faxes, text messages, etc.

Transactions (XA 108) include, but are not limited to, paper documents and digital records received from customers, suppliers, employees, retirees, regulators, etc.

Case files (CF 110) include, but are not limited to, bundles of related services delivered in a coordinated manner over an extended period, such as litigation, advertising, or drug trials.

Queue (Q 112) is a backlog of work. Though queues can form ahead of any activity—and often do in conventional service management—the most likely place to find a queue in DBRS is immediately ahead of the constraint.

Capacity management (CM 114) is procedures, information systems, models, and rules-of-thumb for adjusting capacity to meet a service level agreement (SLA).

Service levels (SL 116) can be measured many ways, such as the number of service requests finished within the target completion time or the number of transactions processed per period without error.

In $DBR_S$ 102, the drum 118 is the constraint because it sets the pace for non-constraints. The buffer 120 is the amount of work ahead of the constraint, which includes all queues and items-in-process within activities. The buffer is bidirectional: Either a shortage or excess of work may trigger a change in capacity. The constraint rope 122 governs changes in capacity at the constraint. The service level rope 124 governs work on the constraint. For instance, items with the nearest due-date may be given priority.

The buffer 120 is measured in the count of items (SR+XA+CF) or the total amount of service time they will require, the constraint rope 122 is measured in items per period or total available service time per period (flow rate), and the service level rope 124 is measured according to the Service Level Agreement (SLA) to which SL 116 strives. Changes in the flow rate needed to achieve service levels are translated into resource levels during capacity management.

The characteristic of $DBR_S$ 102 that most distinguishes it from $DBR_{BP}$ is items can be aggregated across multiple clients 126. Aggregation always reduces random variation in demand because increases for some clients tend to be offset by decreases for other clients. Aggregation also reduces systematic variation in demand if the clients have uncorrelated demand. It reduces systematic variation even more if they have counter-cyclical (negatively correlated) demand.

As described herein, by enabling CM 114 to shift resources across clients and service recipients as needed, $DBR_S$ 102 generates economies of scale. By enabling CM 114 to shift resources across processes, $DBR_S$ 102 generates economies of scope. And by enabling CM 114 to shift work between separate service centers, $DBR_S$ 102 mitigates both natural and man-made risks.

Buffer Sizing

In $DBR_S$ sizing the buffer is critical because it triggers capacity management when necessary. That is, when the buffer level rises above an upper threshold or falls below a lower threshold, the service provider probably cannot achieve the service levels specified in the SLA.

Though there can be many terms and conditions in an SLA, they generally address cycle time, quality, and cost. For example, if a client must submit payroll data at least three days before a service provider is obligated to produce payroll checks and corresponding reports, the provider's cycle time cannot exceed three days. Likewise, the cost per check or per report typically cannot exceed a specified amount, and no more than a specified percentage of checks or reports can contain errors.

Figure 1B:
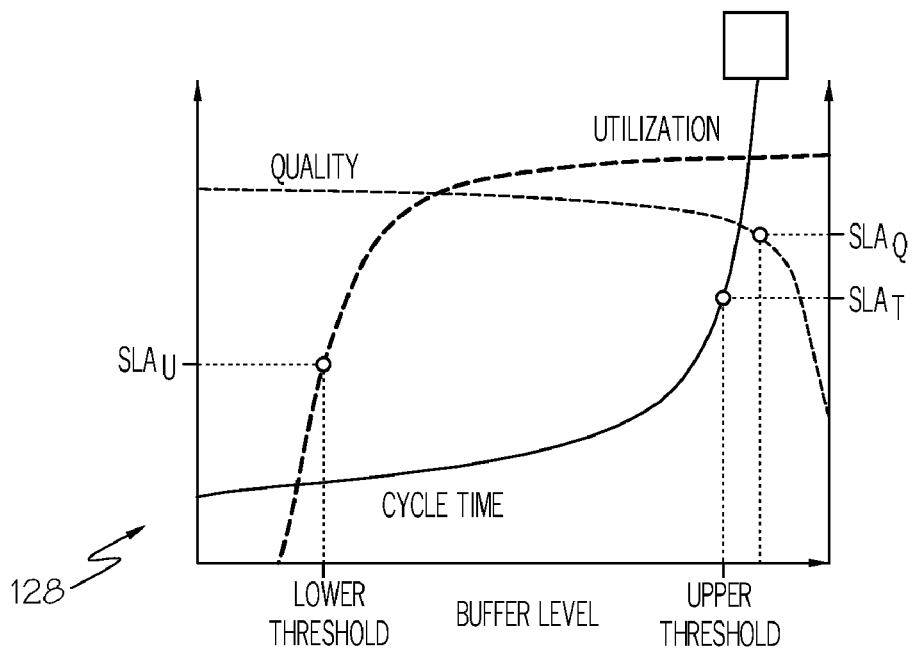
FIGS. 1B-C graphically illustrates a relationship between an amount of work in a Buffer in the DBRS, and the quality, utilization and cycle times that are associated with the DBRS.

The relationships between the amount of work in the buffer and the resulting time, quality, and cost are seldom linear, as illustrated in FIG. 1B. Rather than showing cost, however, the FIG. 1B shows utilization because many of the provider's costs may actually be fixed.

At low buffer levels, cycle time is at its minimum because it includes only service time. As the buffer level grows, cycle time rises gradually due to increasing queue time. However, once the average number of incoming items exceeds the flow rate through the constraint, queues and cycle time rise rapidly.

At low buffer levels, utilization is low because there's not enough work-in-process to keep resources busy. As the buffer level grows, utilization rises steadily due to reduced idle time. However, once incoming items approach the maximum flow rate through the constraint, thereby keeping resources continuously busy, utilization levels off at its maximum.

At low buffer levels, quality is high because there's plenty of time to work carefully. As the buffer grows, quality may decline slightly. However, once incoming items approach the maximum flow rate through the constraint, quality may decline markedly due to haste.

The middle range of these curves—where they are all approximately horizontal—represents dynamic equilibrium. Within that range, incoming and outgoing items are roughly equal because demand fluctuations either average out on their own or are handled by workforce scheduling. If the buffer level drops below that range, however, the process is starved for work. And if it rises above, the process is swamped with work. Thus, suitable places for buffer thresholds are somewhere around the knees of the curves.

Where the service level agreement for cycle time ($SLA_T$) meets the cycle time curve often determines the upper threshold on the buffer. That is, when cycle time rises above $SLA_T$ for a specified duration or for a specified percent of items, the service provider is no longer meeting the SLA.

Where the service level agreement for utilization ($SLA_U$) meets the utilization curve often determines the lower threshold on the buffer. When utilization drops below $SLA_U$, the service provider is not meeting the SLA.

Where the service level agreement for quality ($SLA_Q$) meets the quality curve may determine the upper threshold if quality dominates cycle time. When quality drops below $SLA_Q$, the service provider is no longer meeting the SLA.

These upper and lower thresholds thus define a target buffer range. Note, however, that where the cycle time (processing and queue time), utilization, and quality curves cross one another is arbitrary, and therefore meaningless, because they are plotted against independent vertical axes. The curves, which could have been plotted on separate charts, are shown instead in FIG. 1B in a combined in a single chart to illustrate how various terms of the same SLA translate into one pair of buffer thresholds.

The location and shape of each curve can change over time. Indeed, resource, process, and technical transformations are intended to do precisely that. For example, as skills improve, the process is simplified, and activities are automated, the thresholds may move apart. On the other hand, if the client and provider agree to a more aggressive SLA, the thresholds may move closer.

Buffer Zones

Buffer zones are decision aids. In $DBR_S$ the buffer zones of buffer 120 are bi-directional. That is, there are two red zones (132a-b in FIG. 1A) surrounding a green zone 134. When the buffer level falls below the green zone 134 into the low red zone 132b, this may trigger a decrease in capacity; while rising above the green zone 134 into the high red zone 134a may trigger an increase. In either case, the process manager should decide whether the buffer level will return to the green zone on its own. If not, a change in capacity is required.

Using buffer thresholds from the preceding section to set buffer zones directly would not be appropriate because the process would already be missing the SLA by the time the buffer level strayed into a red zone. Instead, buffer zones should be set where they will allow sufficient lead-time for capacity changes to be enacted before the buffer level passes either threshold.

Figure 1C:
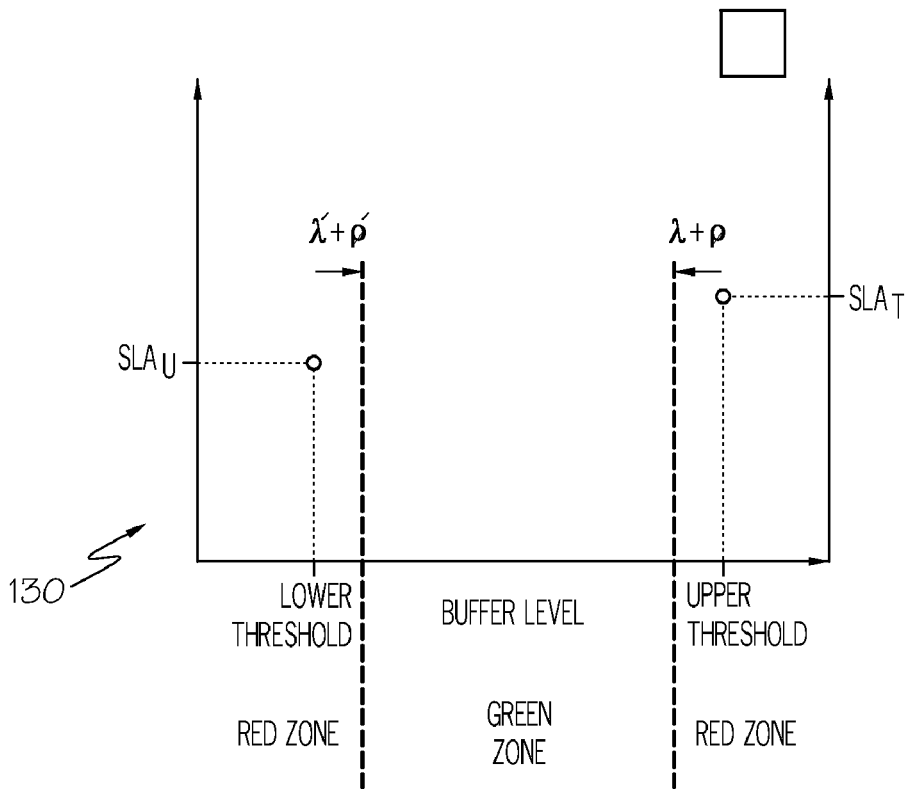

This is accomplished by insetting the red zone boundaries relative to the thresholds by the net change in the buffer level expected during time needed to change capacity. Referring now to FIG. 1C, a subset of FIG. 1B, graph 130 shows the zone boundaries being inset from the thresholds by the mean plus standard deviation of net change.

For example, suppose the lower threshold is 400 items, upper threshold is 600, average net change is 30, and standard deviation of net change is 10. The lower red zone would start at 440, and the upper red zone would start at 560. Whenever the buffer passes beyond one of these zone boundaries, the provider will usually have enough time to change capacity before the buffer level reaches the corresponding threshold and performance fails to meet the SLA.

Capacity Management

Capacity management covers a wide range of possible actions, including:

Activation of alternate service centers, or resumption of normal operations;

Overtime or added shifts to increase capacity, or reduced work schedules to decrease it;

Reassignment of resources between processes or clients using the same process;

Acceleration or deferral of non-critical tasks in order to level work loads;

Queue management to jump critical items to the front;

Substitution of self-service and automation for manual processing during peak periods; and Getting resources from subcontractors or the job market, or shedding resources.

Simulation

Simulation is a widely accepted method for investigating, teaching, and supporting decisions when the subject is too complex for analytical solutions. For example, Queuing Theory (which includes allocations of resources based on needs of a single queue) provides analytical solutions when a process is simple enough and stable enough to satisfy the assumptions behind its equations.

Services, however, can be too complex for Queuing Theory. That is, the number of activities comprising a business process delivered via a service can be large (e.g., easily over 100). Furthermore, the paths items follow through the process may not be deterministic (e.g., some items may be automatable while others are not, some items may require rework while others don't, and some items may be amenable to self-service by the service requester while others are not). Finally, a service provider will often seek to aggregate demand from multiple clients, thereby altering both the volume and mix of inputs over time.

Services can also be unstable. That is, demand patterns are subject to both predictable and unexpected changes (e.g., the busy day of the week is predictable, but a fad or disaster are not). Furthermore, the process itself may change in response to demand patterns (e.g., emergency procedures may be triggered by a disaster). Finally, the process itself will usually evolve over time due to process improvements, technological enhancements, and skill changes among workers.

When services are this complex and unstable, simulation may be the only practical way to do research, teaching, and decision-support. Fortunately, the same basic simulation platform can serve multiple purposes.

Simulation Methods

Figure 2A:
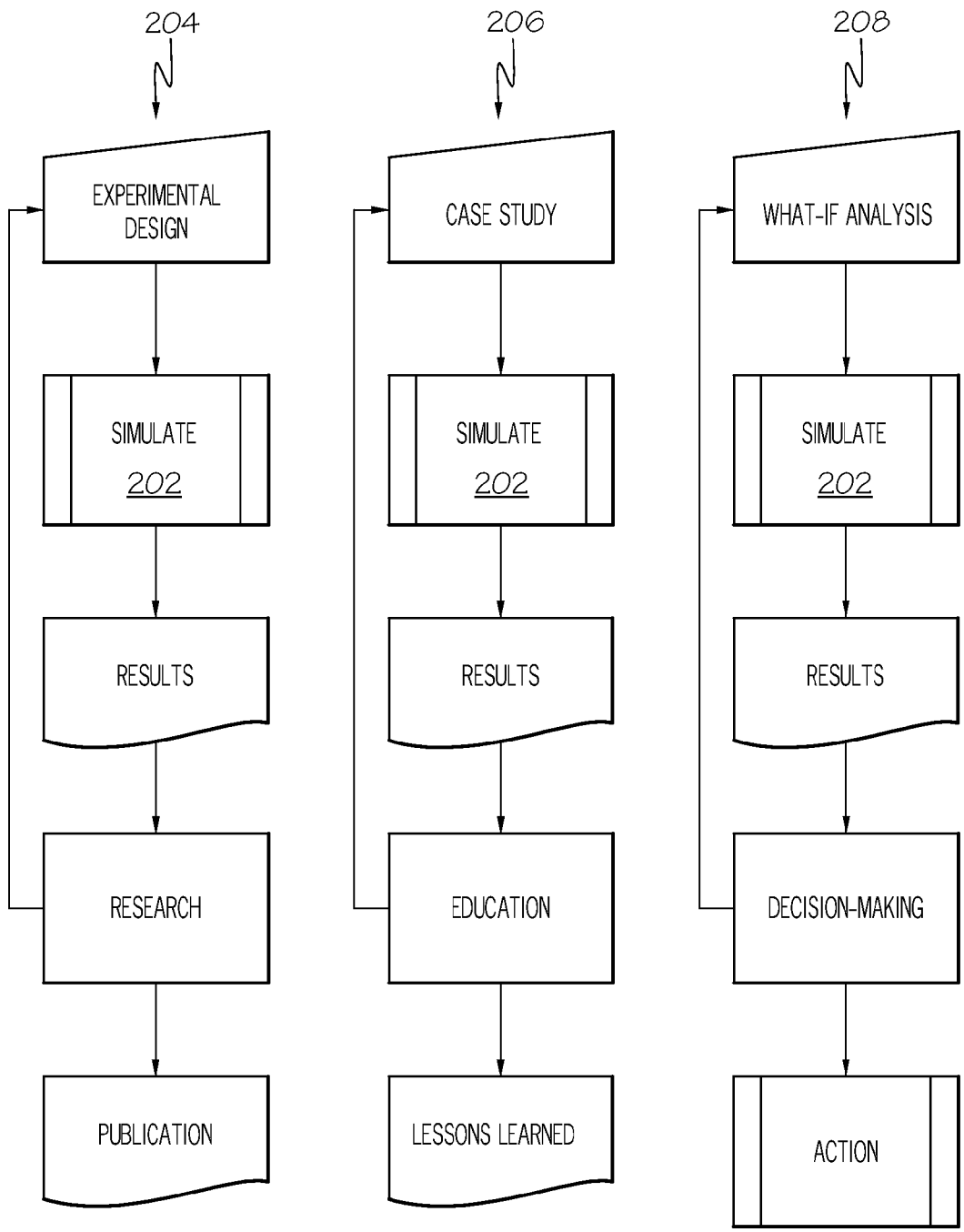
FIG. 2A depicts various simulation flows using the novel DBR$_S$.

As illustrated in FIG. 2A, the present invention simulates $DBR_S$ (block 202) for purposes of research (flow 204), education (flow 206), and decision-support (flow 208). The same simulation software can be used for all purposes, but the context and results may differ.

Regardless of purpose, the process being simulated should be defined by the DBRS. This includes all inputs, activities, queues, paths, and outputs. In addition, parameters such as service times and rework rates should be specified.

For research, decision-making is often simulated. For instance, the role of the person making capacity management decisions can be simulated, as can the role of people making decisions as they perform the process. On the other hand, for education and decision-support, the roles real people will play and the policies they are to follow should be defined. For example, making opposing capacity management decisions (e.g., an increase followed by a decrease) in consecutive periods might be prohibited.

When the purpose is research, an experimental design drives the simulation. That design defines independent, dependent, and control variables. Independent variables are manipulated by the researcher in order to observe their effects on the dependent variables. (Examples are included in later sections.) Control variables are held constant by the researcher or removed statistically in order to eliminate their effects. Many iterations may be run to produce the desired results. Those results are then used to produce a research publication.

When the purpose is education, a case study (also known as a "simulation game") drives the simulation. That case study defines roles and provides information students need to set policies followed by a simulated decision-maker, make their own decisions subject to policies defined by the instructor, or make their own decisions subject to policies set by students filling other roles. More than one iteration may be performed to produce the desired results. If successful, documentation and discussion of those results produces lessons learned by the students. Note that this education can take place in either academic or non-academic settings, such as business, government, or non-profit.

When the purpose is decision-support, what-if analysis drives the simulation. That is, given a situation requiring a decision, the decision-maker asks "what if . . . ?" and uses the simulation to see what results a decision might produce. There may be, for instance, unintended consequences, side effects, unexpected delays, and amplification or dampening effects over time. Those results are then used to make an informed decision and take action. For instance, capacity of the real process might be adjusted, the real process might be redesigned, or the real policies changed. Since the simulated results have no real consequence in and of themselves, the simulation provides a risk-free setting in which to explore alternatives.

Fixed Versus Elastic Capacity

Figure 2B:
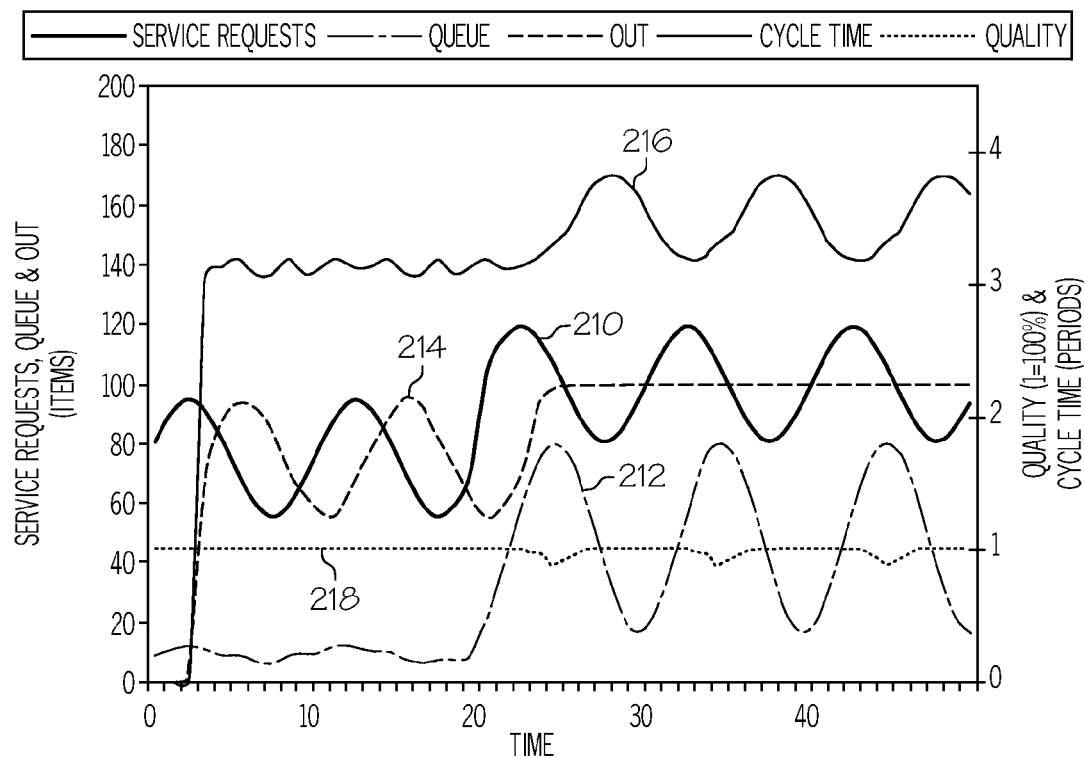
FIGS. 2B-C illustrate the effect of utilizing fixed versus elastic capacity in the DBR$_S$.
Figure 2C:
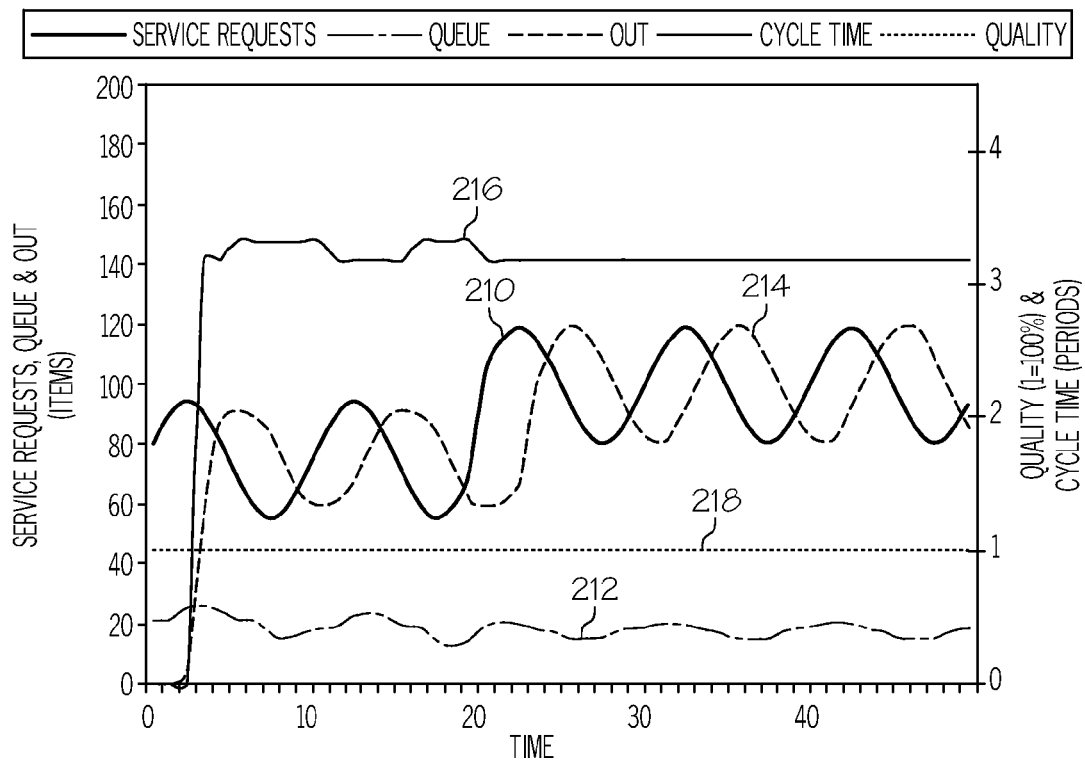

FIGS. 2B-C show results from a pair of sample simulation runs. The business process used and shown for exemplary purposes is extremely simple, consisting of just one activity. Service capacity, the independent variable, is comprised of fixed and elastic scenarios.

Service Requests 210 is a control variable—it is the same in both scenarios shown in FIG. 2B and FIG. 2C—comprised of the number of items entering the simulated business process. Queue 212 is a dependent variable comprised of items waiting for processing. Out 214 is a dependent variable comprised of items that have completed processing. Cycle Time 216 and Quality 218 are dependent variables showing performance of the service over time.

Since the simulation starts empty and idle, it takes several periods to warm up. Thus, the first six periods are ignored when observing simulation results.

In the first scenario shown in FIG. 2B for fixed capacity, the rise in service requests above the capacity of the process in period twenty subsequently results in a significant queue, inconsistent cycle time, and an occasional decline in quality. In the second scenario shown in FIG. 2C for elastic capacity, the same rise in service requests is met by a corresponding adjustment in service capacity, thereby avoiding the rise in the queue, maintaining consistent cycle time, and circumventing the decline in quality.

Balanced Versus Unbalanced Capacity

Figure 2D:
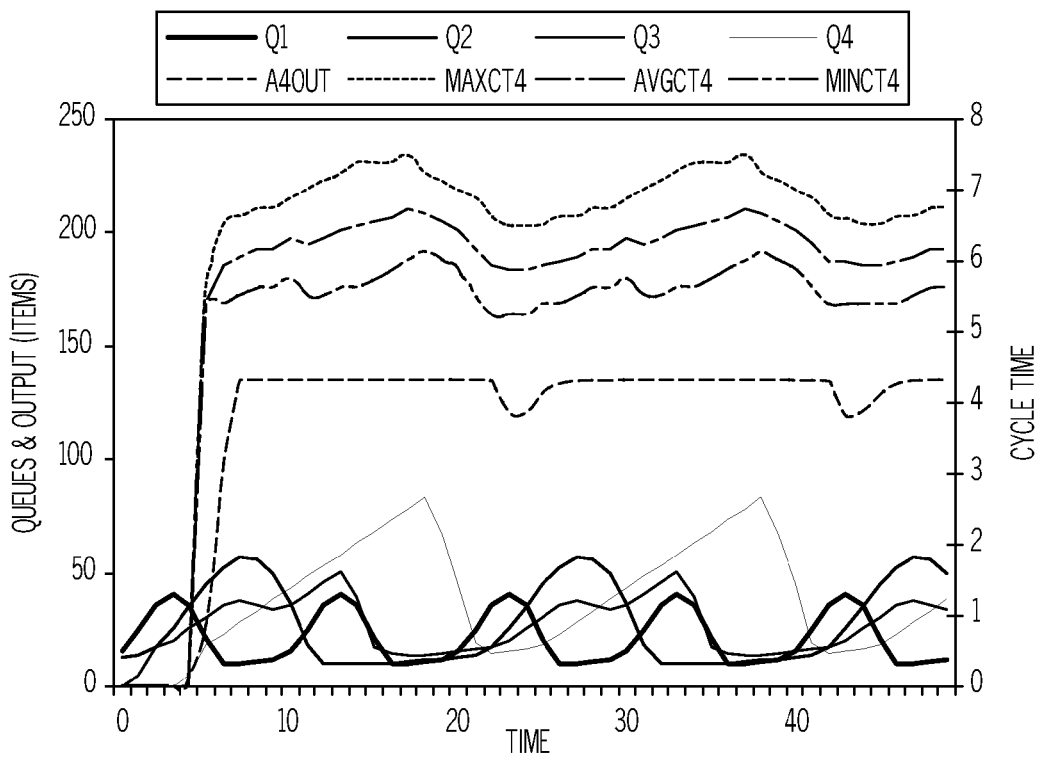
FIGS. 2D-E depict the effect of utilizing balanced versus unbalanced capacity in the DBR$_S$.
Figure 2E:
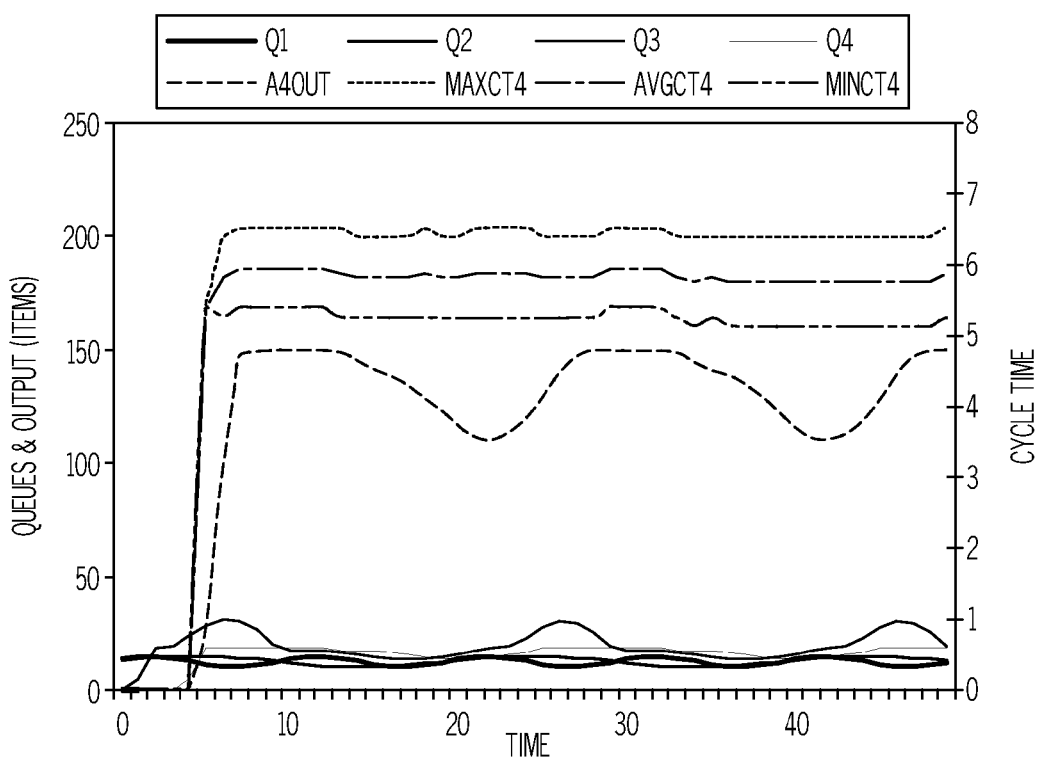

FIGS. 2D-E show results from another pair of sample simulation runs. The business process is a bit more complex, consisting of four activities with multiple paths among them. Service capacity, the independent variable, is comprised of balanced and unbalanced scenarios. With balanced capacity, all activities have the same maximum flow rate. But with unbalanced capacity, some activities can achieve a higher flow rate than others.

Service Requests (not shown) are again a control variable. Queues (Q1 through Q4) are again dependent variables. A4out is a dependent variable comprised of items that have completed processing through all four activities. Several statistics for Cycle Time, the final dependent variable, are shown, including its maximum (maxCT4), average (avgCT4), and minimum (minCT4).

As before, the simulation starts empty and idle, so it takes several periods to warm up. Thus, once again, the first six periods are ignored when observing simulation results.

In the first scenario shown in FIG. 2D for balanced capacity, queues rise and fall ahead of every activity as items work their way through the process. Although the process overall has enough capacity to meet average demand, the queues occur whenever the workload exceeds capacity at a particular activity. Consequently, the output of the process (A4out) is nearly constant, but Cycle Time is variable. And though it can be hard to discern in the chart, activity four is actually the constraint on the overall process, despite the intent to have balanced capacity. This, however, mirrors the way many processes work in the real world: it is hard to establish and sustain truly balanced service capacity.

In the second scenario shown in FIG. 2E for unbalanced capacity, activity three is established as the strategic constraint. That is, all other activities are engineered to have sufficient sprint capacity to keep up with the constraint. Consequently, the output of the process (A4out) matches the demand pattern, but Cycle Time is highly consistent, despite the changes in demand. In other words, by adjusting capacity in response to changing demand, this scenario models services on demand.

Simulation Methods

Process simulations are dynamic in the sense that how a process performs over time is of interest. However, process simulations can either be deterministic or stochastic:

The previous sections illustrated deterministic simulation models since they included no random values. Such simulations are often used for exploratory research and teaching because they exclude noise that can make it hard to see patterns and relationships.

For hypothesis-testing research and decision-support, stochastic simulation models (using random variables) are often useful. In such models, randomness makes the simulations more realistic. Indeed, how a process responds to random events can be central question.

Two simulation methods can be used, depending on the objective of simulation. If the objective is to compare scenarios at a high level, as in the previous sections, a continuous simulation method is often sufficient. In this method, differential equations are used to compute flows through the simulation model during each tick of the simulated clock. However, individual items are not represented in the simulation.

If the objective is to study a process or processes at a low level, a discrete simulation method is often preferred. In this method, individual items are represented in the simulation, and they flow through the simulation model during each tick of the simulated clock.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk—Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a software deploying server 350 via a network 328 using a network interface 330, which is coupled to system bus 306. Network 328 may be an external network such as the Internet, or an internal network such as an Ethernet or a Virtual Private Network (VPN). Note the software deploying server 350 may utilize a same or substantially similar architecture as client computer 302.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory includes additional higher levels of volatile memory (not shown), including, but not limited to, cache memory, registers and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with software deploying server 350.

Application programs 344 in client computer 302's system memory (as well as software deploying server 350's system memory) also include a Drum-Buffer-Rope for Services ($DBR_S$) 348. $DBR_S$ 348 includes code for implementing the processes described in FIG. 4. In one embodiment, client computer 302 is able to download $DBR_S$ 348 from software deploying server 350.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 350 performs all of the functions associated with the present invention (including execution of $DBR_S$ 348), thus freeing client computer 302 from having to use its own internal computing resources to execute $DBR_S$ 348.

Figure 4:
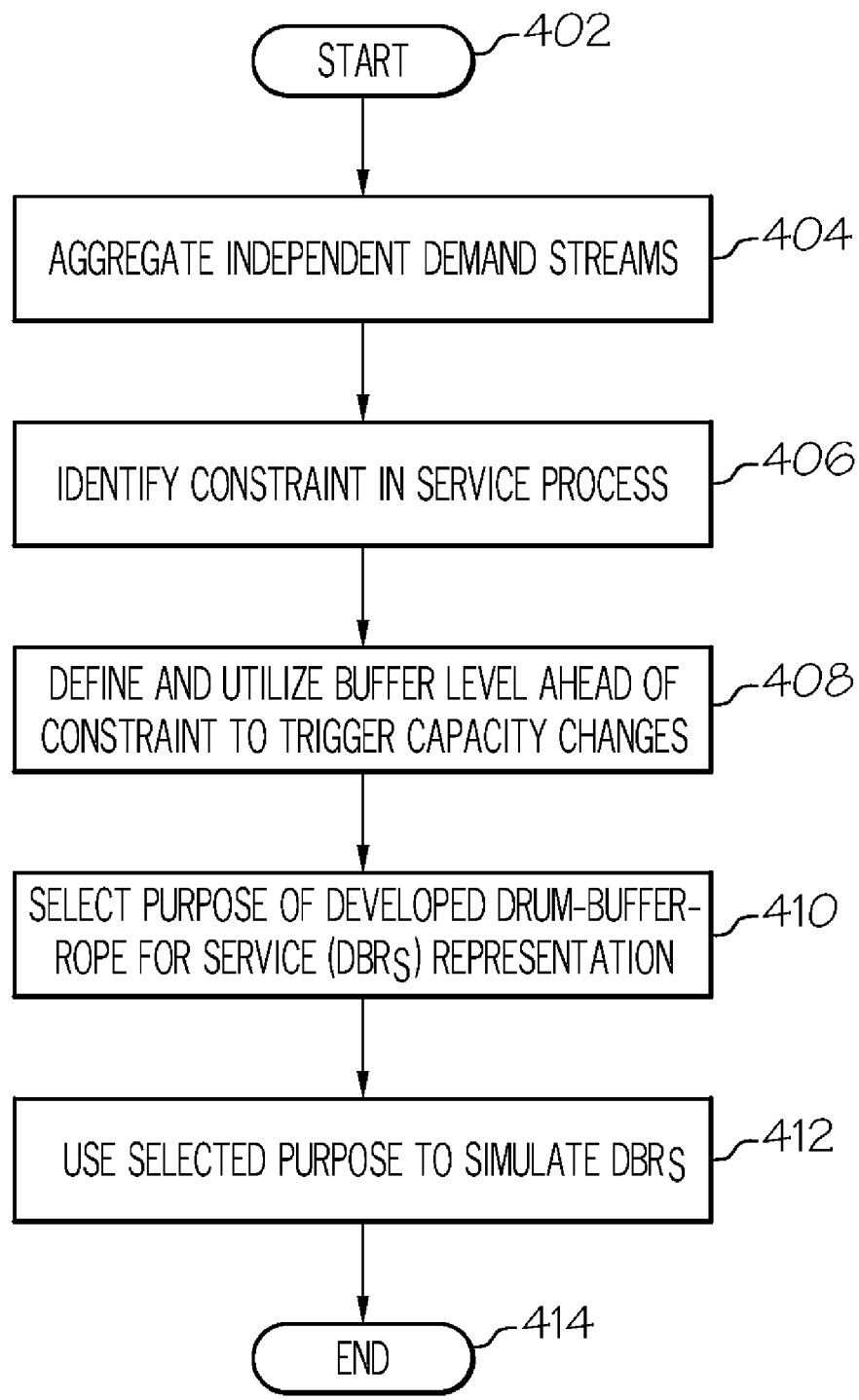
FIG. 4 is a flow-chart of exemplary steps taken by the present invention to simulate and evaluate a service process utilizing DBR$_S$.

With reference now to FIG. 4, a high-level flow-chart of exemplary steps taken b the present invention is presented. After initiator block 402, independent demand streams are aggregated (block 404), as depicted in FIG. 1A. A constraint (e.g., drum 118) is identified in a service process (e.g., service process 104), and a buffer level (as found in buffer 120) is defined (block 408), based at least on part by feedback from a service level rope 124 that lets the drum know if an SLA is being met. This defined buffer is utilized to trigger capacity changes through the use of a constraint rope 122. In a manner described above, the DBRS is simulated, based on what is being evaluated (block 410 and 412), and the process ends (terminator block 414).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of $DBR_S$ 348, are performed by service provider server 350. Alternatively, $DBR_S$ 348 and the method described herein, and in particular as shown and described in FIGS. 1A and 4, can be deployed as a process software from service provider server 350 to client computer 302. Still more particularly, process software for the method so described may be deployed to service provider server 350 by another service provider server (not shown).

Figure 5A:
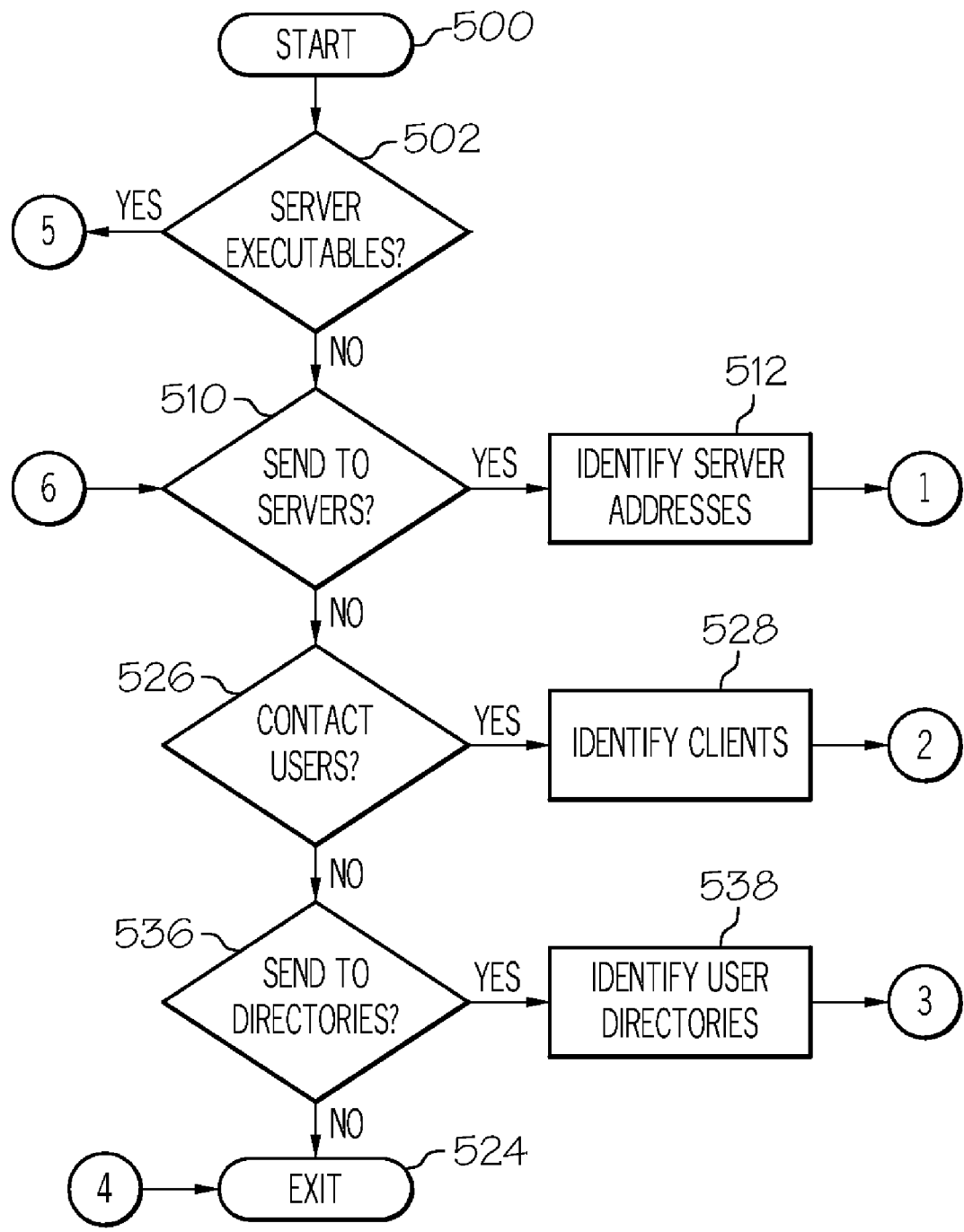
FIGS. 5A-B are flow-charts showing steps taken to deploy software capable of executing the steps described in FIG. 4.
Figure 5B:
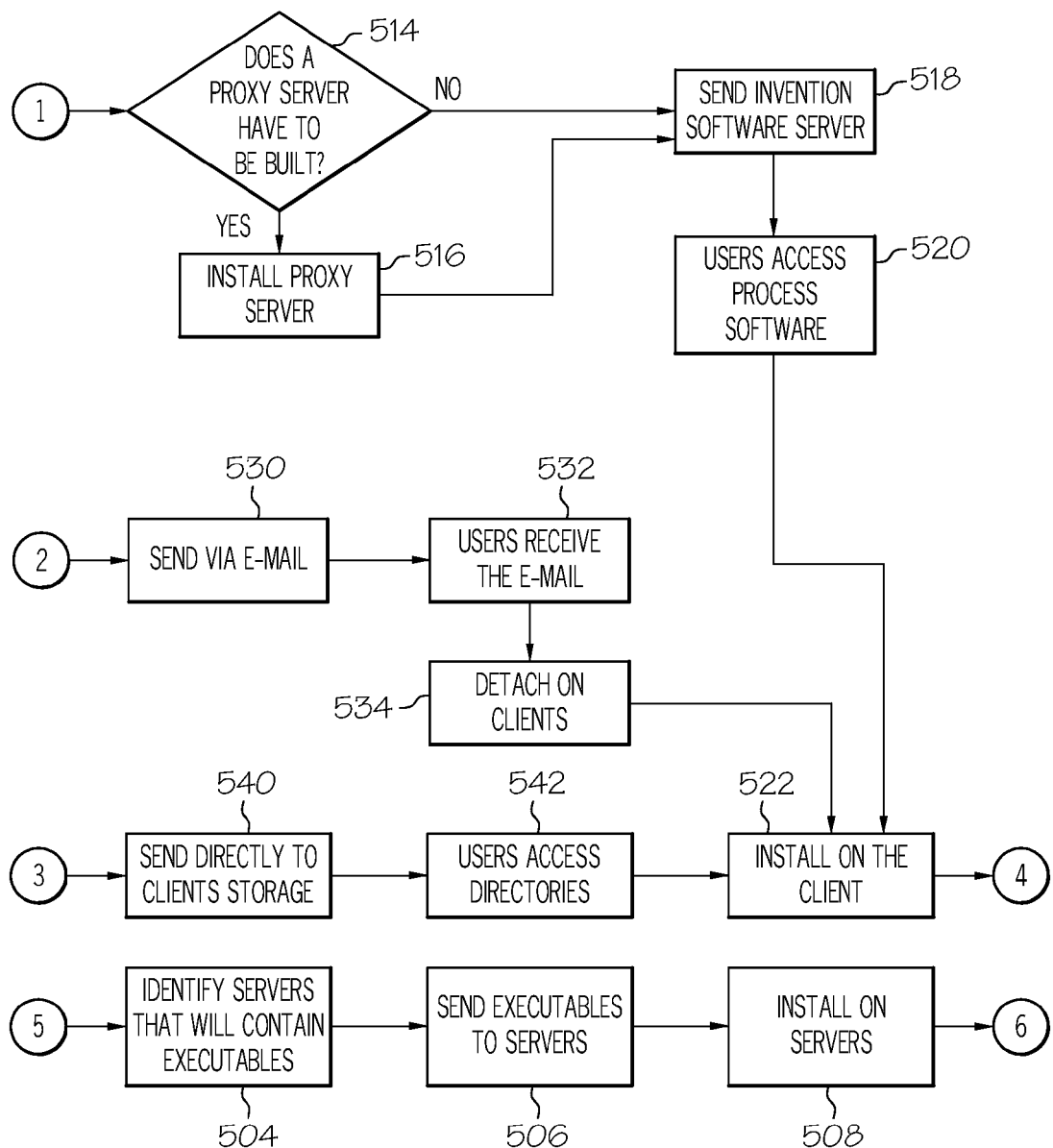

Referring then to FIGS. 5A-B, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
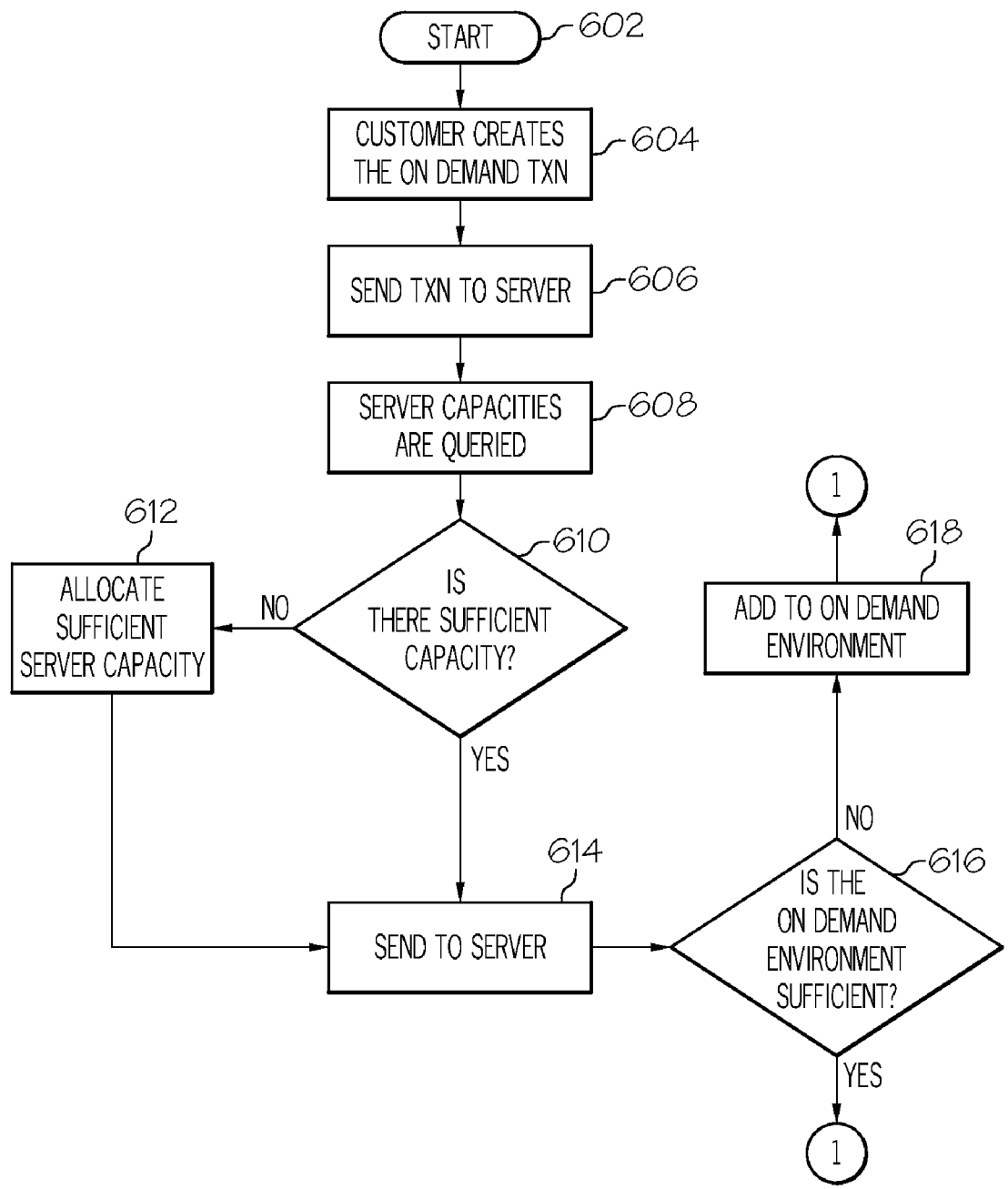
FIGS. 6A-B are flow-charts showing steps taken to execute the steps shown in FIG. 4 using an on-demand service provider.
Figure 6B:
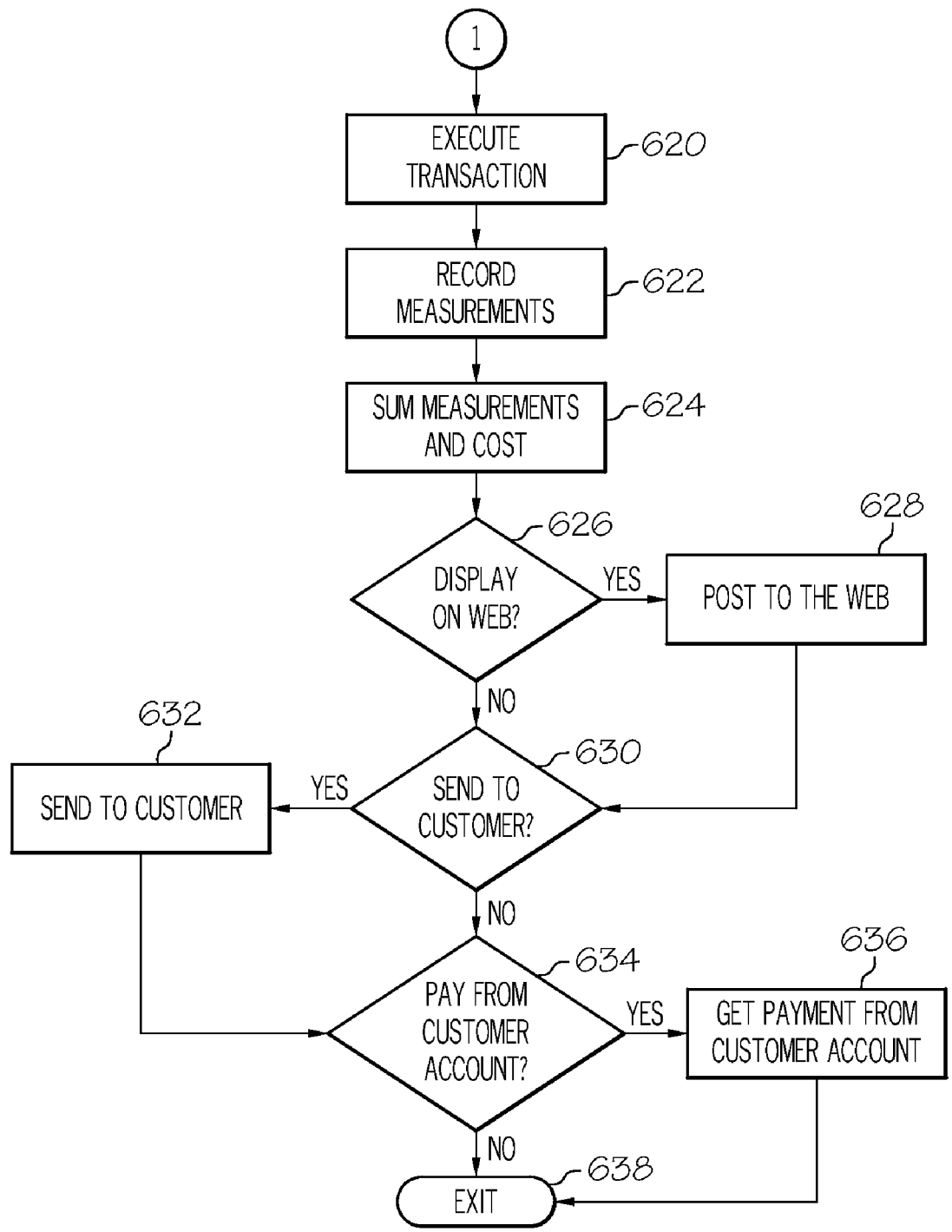

With reference now to FIGS. 6a-b, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

Method Invoking Rules

The methods described herein may be invoked by one or more rules. These rules may be specific for a resource, a network, an enterprise, or any other resource partition at any granularity. The rule can optionally be initiated by a policy. Resources are defined to include hardware resources as well as software resources.

Figure 7A:
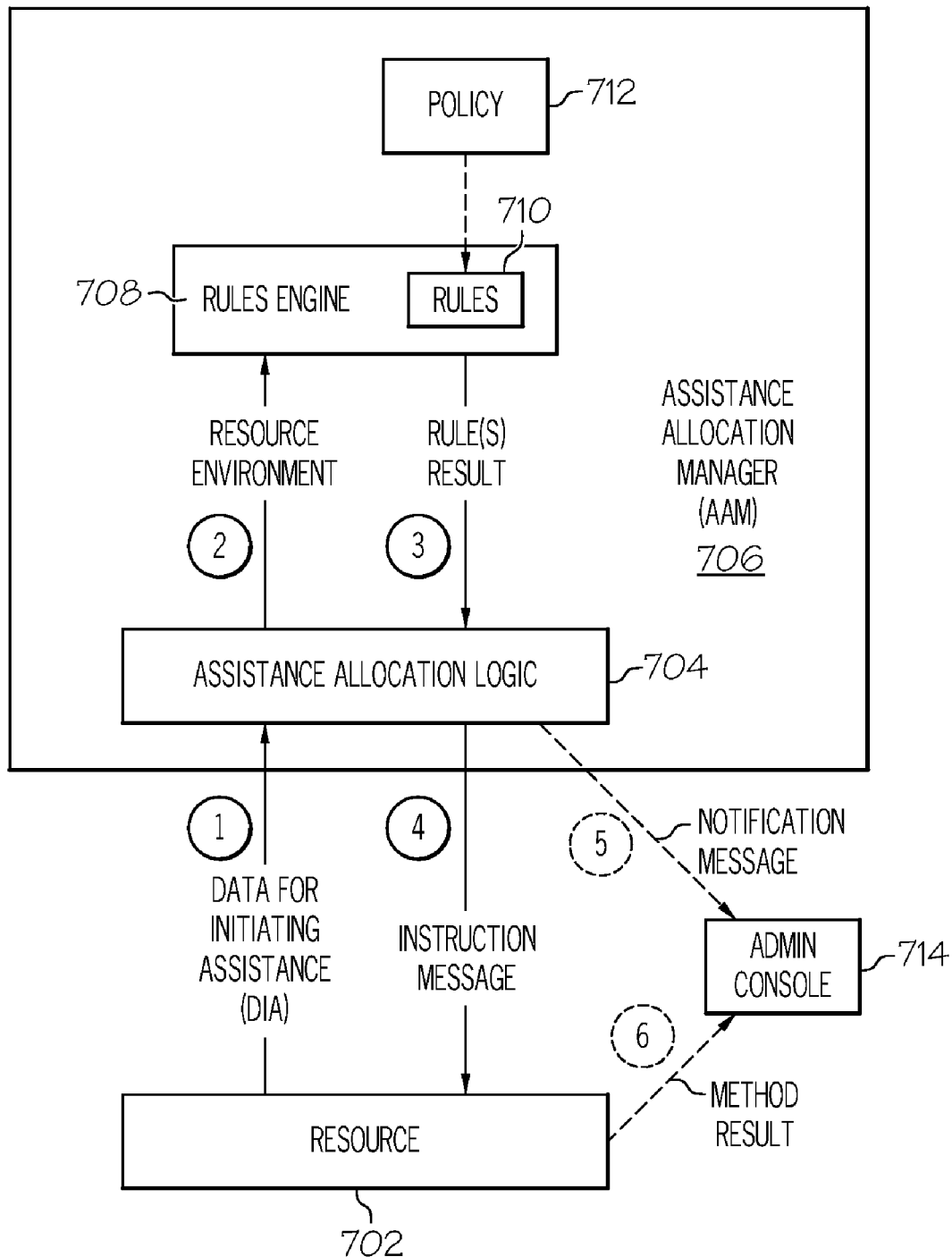
FIGS. 7A-B illustrates a process for utilizing one or more rules to invoke the methods described by the present invention.

For example, consider the infrastructure and process shown in FIG. 7a. As shown in Step 1 (depicted as a circle around the numeral "1"), a resource 702 sends Data for Initiating Assistance (DIA) to an Assistance Allocation Logic (AAL) 704 in an Assistance Allocation Manager (AAM) 706. The DIA may be a request for another resource, such as a particular Webpage, a portal resource (including portlets, etc.), a control instruction, etc. The DIA may also be performance data that is pushed or pulled from the resource 702. That is, resource 702 may issue a DIA requesting delivery of web content, execution of a server-based application, access to a particular website or a particular software resource, including an application, a method/class, a portlet, etc. In addition (or alternatively), the DIA may be performance data, such as data that describes Central Processor Unit (CPU) usage, clock speed, hardware temperature, the number of users (actual or allocated) of the resource, etc. Such examples of types of DIA are exemplary only, and are not to limit the scope of the definition of a DIA.

When AAL 704 receives a DIA, AAL 704 retrieves environment information, which includes state information available to the AAL (e.g., time of day) and data included in the DIA. The resource environment information includes, but is not limited to, the type of DIA (request for a resource, performance data, etc.), an identifier for the resource that sent the DIA, current state conditions of other resources managed by AAM 706, current policies being implemented by an enterprise, etc. The DIA type may be determined by a request type indicator that is part of the DIA (indicating that the DIA is for a request for resource(s), performance data, etc.), or the DIA may be linked to metadata that supplies, identifies, and describes the DIA type.

The DIA, together with any other environmental context (e.g., time of day, the current load on AAM 706, etc.), combine to form resource environment information, which is made accessible to a rules engine 708, as shown at Step 2. Rules engine 708 includes a library of rules 710, which may be expressed as compiled code (e.g., Java™ bytecodes) that ultimately causes resource 702 to execute the steps of the inventive method described above. Other well-known forms of rule expression are also possible. (For example, the Extensible Access Control Markup Language (XACML) standard ratified by the Organization for the Advancement of Structured Information Standards (OASIS) standards body, defines an exemplary form for such a rule expression.) Note that the creation of the rules 710 may be initiated by and responsive to a policy 712. Policy 712 is a (preferably enterprise-wide) policy that describes, in non-technical language, how one or more resources are to be utilized. Policy 712 may be formulated by a person or software logic associated with AAM 706, resource 702, or any other entity (including the enterprise that utilizes resource 702), which has the authority to influence the formulation of the rules 710.

Rules engine 708 evaluates one or more rules 710 in the current environmental context described above. After evaluating the appropriate rule(s) 710 for the current environmental context, rules engine 708 generates a rule(s) result, which is sent from rules engine 708 to AAL 704 (as shown in Step 3). The rule(s) result of Step 3 provides adequate cues for AAL 704 to generate an instruction message for resource 702 (Step 4). This instruction message for resource 702 may be a method call, source code, compiled code, binaries, applets, etc., which are executable by resource 702 to implement the steps of the inventive method described above, or the instruction message may simply set a flag, bit, or other data in resource 702 that will result in resource 702 taking the appropriate steps necessary to implement the inventive method (e.g., calling another resource, initiating a local action, etc.). Note that, as shown in Step 5, an admin console 714 may optionally be notified, concurrently or non-concurrently with Step 4, that resource 702 has received the instruction message. This notification message may include details that include, but are not limited to, DIA information, resource environment information, rule(s) results, as well as results of the inventive method being implemented in resource 702 (Step 6).

Figure 7B:
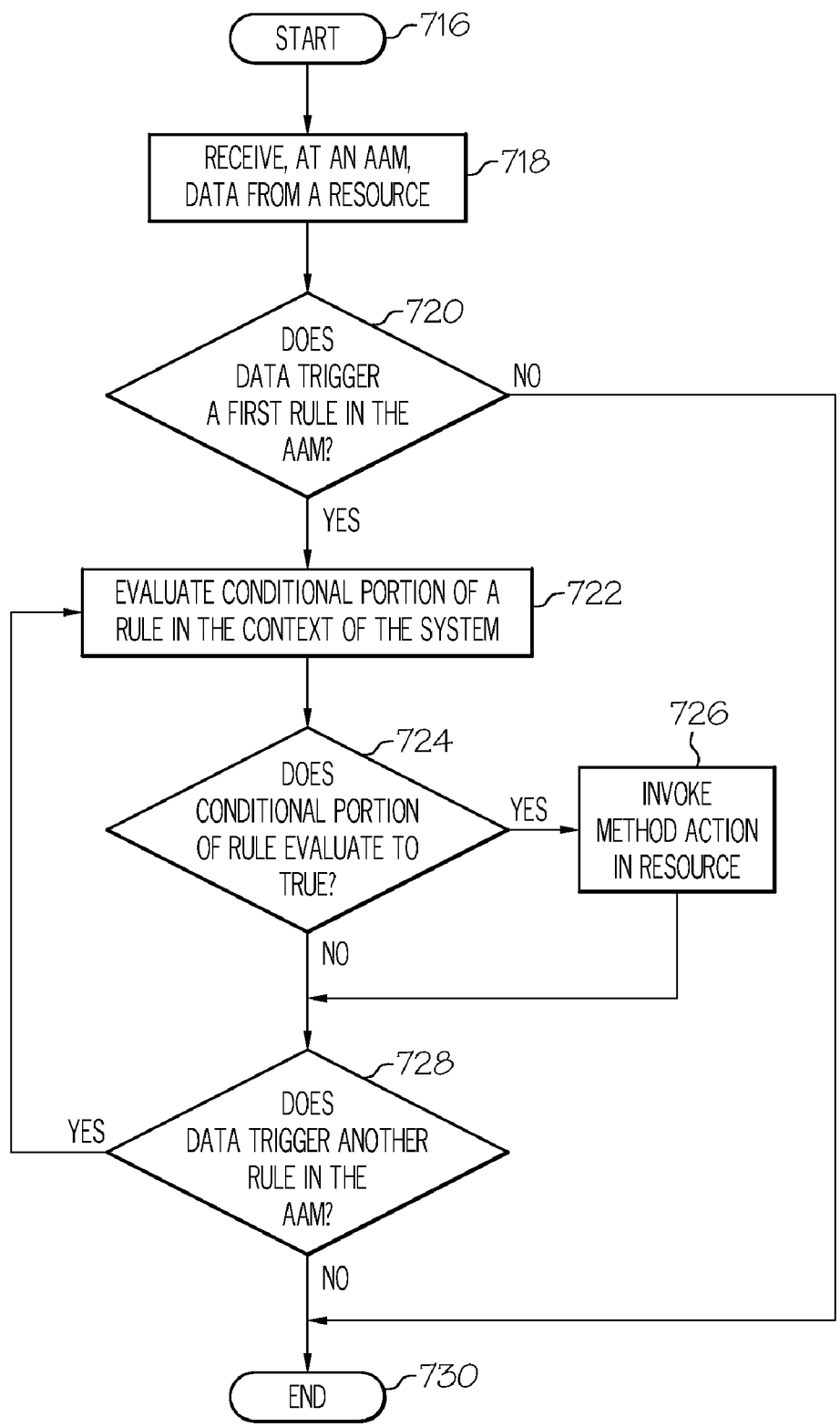

With reference now to FIG. 7b, a flow-chart of exemplary steps taken to invoke a method by a rule is presented. After initiator block 716, an Assistance Allocation Manager (AAM) receives data (e.g., Data for Initiating Assistance—DIA) from a resource (block 718). The AAM may be a web-based service, such as that offered by IBM® Global Services® (IGS™), using a Service Oriented Architecture (SOA) software service such as IBM's Websphere®. The SOA software includes a bottom level of applications (pieces of code that perform some useful function), a middle level of Web services (infrastructure for accessing the applications), and a top layer of business processes (steps taken to call the Web services). Thus, in a preferred embodiment, the AAM is a third party service that manages resources for a customer.

Continuing with FIG. 7b, an evaluation of the DIA is made to determine if the DIA triggers (invokes) a first rule in the AAM (block 720). If so, then a conditional portion of the first rule is evaluated in the context of the system (block 722). As discussed above, the context of the system may include real-time status conditions for the resource (e.g., time, date, current operating condition, number of current users, CPU usage, memory load, etc.). As described in query block 724, if the conditional portion of the called rule evaluates to "TRUE," (i.e., the DIA invokes the rule), then the present invention's method steps are invoked for, and executed in, the resource (block 726). Preferably, rules stored in the AAM are associated with flags that indicate whether one or more rules may be called by a single DIA. Thus, if a flag in the AAM is set to permit multiple rules to be invoked by a single DIA, then an evaluation is made to determine if another rule is invoked by the receipt of the DIA (query block 728). If so, then such other rules are evaluated in an iterative manner as just described until there are no more applicable rules to be invoked (termination block 730).

As described herein, the present invention enables a service provider to perform business processes on demand for one or more clients. By unbalancing capacity and making it elastic, the provider is better able to achieve consistent cycle time and quality at lower cost, which are common service level targets. Furthermore, by aggregating demand from multiple clients and sharing resources across processes, the provider is able to achieve economies of both scale and scope.

Simulating $DBR_S$ has several purposes. First, simulations are a practical way to study $DBR_S$ alternatives before implementation. For example, a strategically located constraint yields better performance, and some ways of adjusting capacity can yield lower cost or higher quality. Second, simulations are an effective way to teach $DBR_S$ concepts and get buy-in from people who work for the service provider and the client. For example, balanced capacity is so ingrained in "conventional wisdom" that people must often participate in simulation games to comprehend how unbalanced capacity can outperform it. Finally, simulations are a compelling way to support decision-making. For example, when unexpected changes in demand occur or the process itself is being reengineered, running various simulation scenarios can alert decision-makers to potential problems before they occur. In some instances, the correct decision is to take no action because the situation will correct itself. In other instances, the best decision is to take an action that seems counter-intuitive, such as allowing some resources to stand idle at times.

Whereas manufacturers can quote long lead times or ship orders late when demand exceeds capacity, many business processes must handle their entire demand within specific time-frames to avoid serious consequences. For instance, employees expect to be paid on payday, no matter what demands have been placed on the human resources department lately. And the government imposes severe penalties for late tax filings and payments. Likewise, consumers have high expectations and many alternatives, so are unlikely to remain loyal when receiving poor service.

When business processes are performed by a service provider on behalf of clients, the same requirements apply. In addition, clients expect better cost, quality, or speed than they could achieve by performing the processes themselves.

While DBR for Manufacturing ($DBR_M$) regulates process inputs according to available capacity, DBR for Services ($DBR_S$) cannot do so. Instead, $DBR_S$ adjusts capacity by altering one of the feedback loops so that it invokes capacity management as needed. In addition, $DBR_S$: Aggregates demand from multiple clients; Shares resources across clients and processes as necessary; Unbalances capacity so that non-constraints can keep up with the constraint; Creates elastic capacity that expands and shrinks with demand; Manages capacity according to service level agreements; and Uses the buffer level ahead of the constraint to trigger capacity changes.

$DBR_S$ provides the benefits of: The service provider can handle variable demand and bounded due-dates concurrently; Capacity adjustment occurs less often than with disaggregated demand; Capacity management is simpler than with balanced capacity; The constraint is more stable (less prone to float to another activity); The business process can change without upsetting the DBR framework; Demand aggregation and resource sharing generate economies of scale and scope; The constraint can dampen volatility at downstream activities; and The push for utilization is tamed into the pull of service levels.

Thus, as described herein, the present invention provides for a method, system and computer-readable medium for analyzing a service level for services offered by a service enterprise. In a preferred embodiment, the method includes the steps of: aggregating multiple independent streams of service demands, wherein the multiple independent streams of service demands are from multiple clients that are serviced by a single service enterprise; identifying a constraint in a service stream provided by the single service enterprise;

defining a buffer level before the constraint, wherein the buffer level defines necessary pre-constraint levels of activity to ensure that the constraint is capable of operating at maximum efficiency; utilizing the buffer level to trigger capacity changes to operations before the constraint, wherein triggered capacity changes cause the necessary pre-constraint levels of activity; and simulating operation of the service stream through the use of a simulation that incorporates the multiple independent streams of service demands, the constraint, the buffer level before the constraint and the triggered capacity changes. The buffer level may also be used to adjust the constraint itself, such that in response to the buffer level straying outside the necessary pre-constraint levels of activity, changing a capacity of the constraint, thereby causing the buffer level and the constraint to be aligned such that the constraint is operating at optimal capacity. For example, when the buffer strays into a red zone 132 shown in FIG. 1A, this may trigger a change in capacity at the constraint itself. In one embodiment, this trigger allows the resources that are "upstream" and "downstream" to function at an optimal rate, since they do not have to "sprint" to adjust to the misadjusted constraint. That is, if the constraint is operating too fast, then upstream resources must "sprint" to keep the constraint fed with work. If the constraint is operating too slowly, the some of the output of the constraint will be behind schedule, thus causing downstream resources to "sprint" to get the ultimate service delivered on time. By adjusting the constraint in accordance with the buffer, such "sprints" are not necessary.

The simulation may be used to test an experimental design of the service stream, to test a case study of the service stream, or in a "what-if" analysis of the service stream, wherein the "what-if" analysis changes at least one parameter in the service stream. In one embodiment, a same simulation is used in a test of an experimental design of the service stream, in a test of a case study of the service stream, and in a "what-if" analysis of the service stream. The simulation may compare elastic versus inelastic capacities of operations performed in the service stream, as well as balanced versus unbalanced capacities in operations performed in the service stream. The simulation may create a deterministic simulation model in which variables, which describe operations performed in the service stream, are non-random. Alternatively, the simulation may create a stochastic simulation model in which variables, which describe operations performed in the service stream, are random. In another embodiment, the method further includes the steps of: receiving, by an Assistance Allocation Manager (AAM), a Data for Initiating Assistance (DIA) from a resource in a data processing system; and in response to receiving the DIA, executing a rule, in the AAM, that is specific for the DIA and the resource that sent the DIA, wherein executing the rule in the AAM causes the steps described herein to be executed for the resource that sent the DIA.

In another preferred embodiment, the method includes the steps of creating a Drum-Buffer-Rope for Services ($DBR_s$) model of a service process; simulating the service process by populating the $DBR_s$ model with user-selected values for a constraint drum, a pre-constraint buffer, a service level rope, and a constraint rope, and determining if the service process will be in compliance with a Service Level Agreement (SLA) based on a $DBR_s$ simulation of the service process.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method for analyzing a service level for services offered by a service enterprise, the method comprising a processor executing code to perform the functions of:

aggregating multiple independent streams of service demands, wherein the multiple independent streams of service demands are from multiple clients that are serviced by a single service enterprise;

identifying a constraint in a service stream provided by the single service enterprise;

defining a buffer level before the constraint, wherein the buffer level defines necessary pre-constraint levels of activity to ensure that the constraint is capable of operating at maximum efficiency;

utilizing the buffer level to trigger capacity changes to operations before the constraint, wherein triggered capacity changes cause the necessary pre-constraint levels of activity; and simulating operation of the service stream through the use of a simulation that incorporates the multiple independent streams of service demands, the constraint, the buffer level before the constraint and the triggered capacity changes.

2. The method of claim 1, further comprising:

in response to the buffer level straying outside the necessary pre-constraint levels of activity, changing a capacity of the constraint, thereby causing the buffer level and the constraint to be aligned such that the constraint is operating at optimal capacity.

3. The method of claim 1, wherein the simulation is used to test a case study of the service stream.

4. The method of claim 1, wherein the simulation is used in a "what-if" analysis of the service stream, wherein the "what-if" analysis changes at least one parameter in the service stream.

5. The method of claim 1, wherein a same simulation is used in a test of an experimental design of the service stream, in a test of a case study of the service stream, and in a "what-if" analysis of the service stream.

6. The method of claim 1, wherein the simulation compares elastic versus inelastic capacities of operations performed in the service stream.

7. The method of claim 1, wherein the simulation compares balanced versus unbalanced capacities in operations performed in the service stream.

8. The method of claim 1, wherein the simulation creates a deterministic simulation model in which variables, which describe operations performed in the service stream, are non-random.

9. The method of claim 1, wherein the simulation creates a stochastic simulation model in which variables, which describe operations performed in the service stream, are random.

10. The method of claim 1, further comprising:

receiving, by an Assistance Allocation Manager (AAM), a Data for Initiating Assistance (DIA) from a resource in a data processing system; and in response to receiving the DIA, executing a rule, in the AAM, that is specific for the DIA and the resource that sent the DIA, wherein executing the rule in the AAM causes the steps described in claim 1 to be executed for the resource that sent the DIA.

11. A computer-readable storage medium embodying computer program code for analyzing a service level for services offered by a service enterprise, the computer program code comprising computer executable instructions configured for:

aggregating multiple independent streams of service demands, wherein the multiple independent streams of service demands are from multiple clients that are serviced by a single service enterprise;

identifying a constraint in a service stream provided by the single service enterprise;

defining a buffer level before the constraint, wherein the buffer level defines necessary pre-constraint levels of activity to ensure that the constraint is capable of operating at maximum efficiency;

utilizing the buffer level to trigger capacity changes to operations before the constraint, wherein triggered capacity changes cause the necessary pre-constraint levels of activity; and simulating operation of the service stream through the use of a simulation that incorporates the multiple independent streams of service demands, the constraint, the buffer level before the constraint and the triggered capacity changes.

12. The computer-readable storage medium of claim 11, wherein a same simulation is used in a test of an experimental design of the service stream, in a test of a case study of the service stream, and in a "what-if" analysis of the service stream.

13. The computer-readable storage medium of claim 11, wherein the simulation compares elastic versus inelastic capacities of operations performed in the service stream.

14. The computer-readable storage medium of claim 11, wherein the simulation compares balanced versus unbalanced capacities in operations performed in the service stream.

15. The computer-readable storage medium of claim 11, wherein the simulation compares elastic versus inelastic capacities for operations performed in the service stream.

16. The computer-readable storage medium of claim 11, wherein the simulation creates a deterministic simulation model in which variables, which describe operations performed in the service stream, are non-random.

17. The computer-readable storage medium of claim 11, wherein the computer-usable medium is a component of a remote server, and wherein the computer executable instructions are deployable to a client computer from the remote server.

18. The computer-readable storage medium of claim 11, wherein the computer executable instructions are capable of being provided by a service provider to a customer on an on-demand basis.

19. A computer-implemented method for simulating services performed on demand, wherein the method comprises a processor executing code for performing the functions of:

creating a Drum-Buffer-Rope for Services (DBRS) model of a service process; and simulating the service process by populating the DBRS model with user-selected values for a constraint drum, a pre-constraint buffer, a service level rope, and a constraint rope.

20. The method of claim 19, further comprising:

determining if the service process will be in compliance with a Service Level Agreement (SLA) based on a DBRS simulation of the service process.

* * * * *